United States Patent [19]

Bellus

[11] Patent Number: 5,147,716
[45] Date of Patent: Sep. 15, 1992

[54] MULTI-DIRECTIONAL LIGHT CONTROL FILM

[75] Inventor: Peter A. Bellus, St. Paul, Minn.

[73] Assignee: Minnesota Mining and Manufacturing Company, Saint Paul, Minn.

[21] Appl. No.: 367,489

[22] Filed: Jun. 16, 1989

[51] Int. Cl.$^5$ .................... B32B 5/08; G05D 25/00
[52] U.S. Cl. .................... 428/323; 264/1.3; 264/108; 339/296; 339/580; 339/601; 339/613; 428/294; 428/328; 428/329; 428/330
[58] Field of Search .......... 428/294, 295, 323, 328, 428/329, 330, 413, 417, 480; 264/1.3, 1.4, 108; 359/296, 580, 601, 613

[56] References Cited

U.S. PATENT DOCUMENTS

| | | | |
|---|---|---|---|
| 1,955,923 | 4/1934 | Land | 359/253 |
| 1,956,867 | 1/1933 | Land | 264/108 |
| 2,286,569 | 6/1942 | Pollack | 264/108 |
| 2,584,441 | 2/1952 | Fredendall | 350/453 |
| 2,981,980 | 5/1961 | Brown et al. | 264/108 |
| 3,066,355 | 12/1962 | Schloemann et al. | 264/108 |
| 3,222,515 | 12/1965 | Orr | 362/330 |
| 3,312,763 | 4/1967 | Peccerill et al. | 264/108 |
| 3,341,274 | 9/1967 | Marks | 359/296 |
| 3,441,408 | 4/1969 | Schladitz | 419/45 |
| 3,454,687 | 7/1969 | Ciofani | 264/1.6 |
| 3,582,189 | 6/1971 | Moritz | 350/613 |
| 3,676,273 | 7/1972 | Graves | 264/108 |
| 3,919,559 | 11/1975 | Stevens | 378/154 |
| 3,922,440 | 11/1975 | Wegwerth et al. | 428/437 |
| 3,927,930 | 12/1975 | Goldberg et al. | 428/900 X |
| 3,955,962 | 5/1976 | Dawihl et al. | 75/347 |
| 4,066,332 | 1/1978 | Kato et al. | 350/453 |
| 4,125,319 | 11/1978 | Frank et al. | 359/296 |
| 4,128,685 | 12/1978 | Lowrey et al. | 428/212 |
| 4,273,807 | 6/1981 | Berry | 427/132 |
| 4,288,081 | 9/1981 | Sado | 264/108 |
| 4,422,963 | 12/1983 | Thompson et al. | 252/583 |
| 4,604,297 | 8/1986 | Liu | 427/64 |
| 4,877,313 | 10/1989 | Saxe et al. | 359/253 |

OTHER PUBLICATIONS

Hayes, Charles F., *Journal of Colloid and Interface Science*, vol. 52, No. 2, Aug. 1975, "Observation of Association in a Ferromagnetic Colloid", pp. 239–244.

Goldberg, P. et al., *Journal of Applied Physics*, vol. 42, No. 10, Sep. 1971, "Polarization of Light in Suspensions of Small Ferrite Particles in a Magnetic Field", pp. 3874–3876.

Manaevskii, M. A. et al., *Chemical Abstracts*, 97:205078 f, Opt. Spektrosk. 1982, 53(3) 392 4.

Primary Examiner—George F. Lesmes
Assistant Examiner—Christopher Brown
Attorney, Agent, or Firm—Kinney & Lange

[57] ABSTRACT

A light control film includes a light transmissive matrix sheet and a plurality of opaque aciculae disposed throughout the sheet and oriented such that the longitudinal axis of each of the acicula is generally perpendicular to the face of the sheet.

12 Claims, 1 Drawing Sheet

MULTI-DIRECTIONAL LIGHT CONTROL FILM

BACKGROUND OF THE INVENTION

1. Field of the Invention

The present invention relates to light control film and in particular to light control film that reduces glare.

2. Description of the Prior Art

Luminous displays, for example, televisions, computer monitors and LED calculator displays, are a popular means of supplying visual information. One major shortcoming of these displays is a tendency to reflect light from other sources back to an observer. These reflections are commonly known as "glare" and interfere with the perception of the luminous display.

One approach to preventing or controlling glare is the use of a polarizing film, since reflected light is generally partially polarized. The polarizing film may be oriented to minimize transmission of light polarized in a first direction. However, the polarized film remains transmissive to light polarized in a second direction, perpendicular to the first direction. Thus, some reflected light passes through the film and this approach has limited utility.

U.S. Pat. No. 4,604,297 to Liu discloses a method of controlling light transmission through a reflective/transmissive surface by first creating surface irregularities having an anti-glare effect and then applying an inert liquid coating sufficiently thick to remove at least some, but not all, of the anti-glare effect. The surface irregularities are created by applying a dispersion and allowing it to dry to form a coating that reduces reflective glare at the surface. This patent discusses the problem of surface glare on computer monitors, and allowing light to pass from the viewing surface to the viewer.

Other approaches to controlling the passage of light through a film include U.S. Pat. No. 3,919,559 to Stevens which teaches a process for producing a film including radio-opaque, louvre-like elements of divergent or convergent orientation. Pairs of the films may be used to form Bucky grids for x-rays. U.S. Pat. No. 3,922,440 to Wegwerth et al. teaches a light control film with louvers which is bonded to a transparent protective covering material. U.S. Pat. No. 4,128,685 to Lowrey et al. discloses a skivable billet having an improved uniform heat absorption ability in which layers of enhanced optical density comprise water soluble polyazo direct dyes such as Formanil Black G and finely divided silica.

U.S. Pat. No. 3,222,515 to Orr discloses an apparatus for controlling the dispersion of light from a localized source such as a fluorescent tube. The device includes a film approximately 2 mils thick with aligned air spaces or bubbles which reflect at one angle and transmit at another angle.

Another body of art relates to devices that require the presence of an external electric or magnetic field for function. U.S. Pat. No. 1,955,923 to Land discloses a light valve and a method of operating the light valve. The disclosed light valve includes a light-transmitting fluid-suspending medium having a dispersed suspension of polarizing particles therein, showing Brownian movement and susceptible to an electrically controlled field of force and means adapted for applying such a field to said particles, i.e. an electric or a magnetic field. One embodiment of the light valve comprises a container and a suspension of particles susceptible to a magnetic field.

U.S. Pat. No. 3,341,247 to Marks discloses an electrically responsive light control device employing suspended dipole particles within liquid droplets enclosed in a plastic film. The particles may be temporarily aligned by an electric field to either reflect or transmit light.

The dipole particles of Marks are preferably about 2,000 to 3,500 Angstroms in length, and their cross sectional width is about 200 to 700 Angstroms. These dimensions are necessary, according to Marks, to allow the dipole particles to effectively reflect or scatter visible light incident upon them at an angle of approximately plus or minus 40° to the normal of their longitudinal axis and to add substantially no reflectivity or scatter at other angles. Marks also teaches that larger particles, up to about 50 microns in diameter by about one micron thick may be employed where light scatter is not objectionable.

The prior art has failed to recognize the desirability of a light control film comprised of polarizable particles that do not require the presence of an external electric or magnetic field for their operation. Furthermore, the art has failed to provide an article, such as a film, for use on a luminous display which reduces glare originating from multiple sources, such as side and overhead lighting, while remaining generally transmissive to light emitted from the luminous display in a direction normal to the face of the display. This failure of the prior art has been overcome in the present invention by providing a plurality of opaque aciculae or whiskers, locked in a transparent matrix in an orientation such that the longitudinal axis of each acicula is generally parallel to the direction of desired light passage.

SUMMARY OF THE INVENTION

The present invention includes an article comprising a matrix of a generally light transmissive material and a plurality of aciculae having their major axes generally aligned in parallel within said matrix. The article is generally transmissive to light impinging from a first direction and opaque to light impinging from a second direction. The article includes a generally light transmissive matrix and a plurality of opaque aciculae disposed throughout the matrix and oriented such that the longitudinal axes of the aciculae are generally parallel to each other. The article may be a light control film including a solid or visco-elastic polymeric matrix sheet and aciculae oriented perpendicular to the faces of the sheet. Such a light control film is particularly useful for controlling glare from one or more light sources located at an angle to the longitudinal axes of the aciculae. Operation of the article of present invention does not require the presence of an external magnetic field nor polarization of the transmitted light by the aligned aciculae. Therefore, the utility of the present invention is independent of any polarization of the reflected light to be controlled or of any transmitted light conveying information. While an external magnetic field may be used to produce the initial parallel alignment of the aciculae, the field is not required to maintain the alignment of the aciculae after solidification of the support matrix.

Another embodiment of the invention includes a light control film having a first region of parallel aciculae aligned at a first angle to the film surface and a second region of parallel aciculae aligned at a second angle to the film surface. Light radiating from a luminous display screen and impinging on the first region of the film is transmitted through the first region in a direction parallel to the axes of the aciculae of the first region. Light radiating from a luminous display screen and impinging on the second region of the film is transmitted through the second region in a direction parallel to the axes of the aciculae of the second region. Such a light control film is useful for allowing a first observer situated at a location aligned with the axes of the aciculae of the first region to view a first region but not a second region of a television screen or computer monitor and allowing a second observer aligned with the axes of the aciculae of the second region, to view a second region of the screen but not the first region. Further, such a light control film reduces glare for both observers.

Additionally, the present invention includes a process for preparing a light control article having a region which is generally transmissive to light impinging upon the region of the article from a first direction and opaque to light impinging upon the region of the article from a second direction including the steps of providing a mixture of opaque aciculae and a solidifiable liquid in a mold of a desired shape; orienting the aciculae of the region in a generally parallel arrangement with each other; and solidifying the liquid to lock the aciculae of reion in the oriented arrangement.

DETAILED DESCRIPTION OF THE PREFERRED EMBODIMENTS

Figure 1:
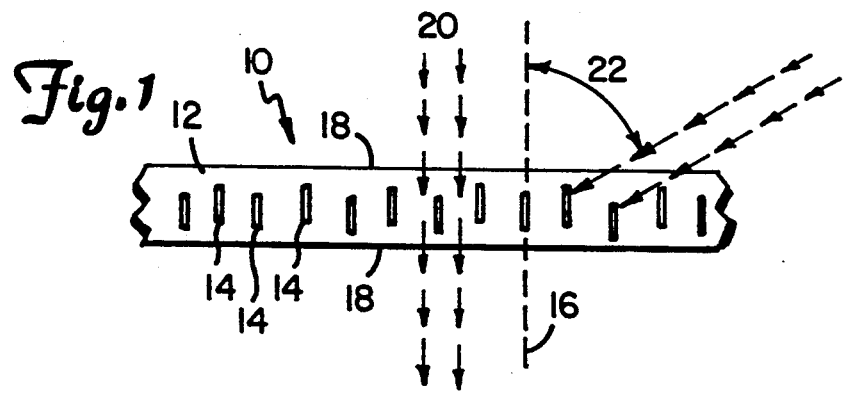
FIG. 1 is an enlarged cross-sectional representation of the preferred embodiment of the present invention.

The preferred embodiment of the invention, as represented schematically in FIG. 1 at 10, is a 0.050 inch (1.25 mm.) thick transparent polyester film or matrix 12 which includes a plurality of opaque aciculae or whiskers 14 aligned parallel to axis 16 which is perpendicular to the film surface 18. By "aciculae" is meant particles (or collections of smaller particles) which have a generally needle-like shape, with a longitudinal or major axis at least five times as great as the particle diameter. The aligned aciculae 14 are randomly distributed throughout the film 12 and are preferably formed of iron. The dimensions of a typical acicula 14 are about 500 microns in length and about 0.2 microns in diameter. The aciculae 14 are present in a concentration such that the film 10 transmits substantially all of the light 20 entering the film in a direction perpendicular to the film surface 18 but rejects transmission of or is opaque to light entering the film at an angle 22 greater than approximately 45° (as measured from normal to the film surface 18). The light control film 10 is useful for eliminating most of the glare from a television screen, computer monitor or other luminous display.

In preparing a preferred embodiment, magnetically alignable aciculae or whiskers are intimately mixed with a liquid, solidifiable resin. One method of achieving the desirable uniform mixture of the aciculae within the resin is to add glass balls and mill in a ball mill for 24 hours. This method tends to add air to the mixture. The mixture can be separated from the air by allowing the mixture to stand in a quiescent state for a time sufficient to separate the air as a frothy layer. The time required is primarily a function of resin viscosity, with less viscous resins requiring less time. A resin with a viscosity of several thousand cps may require as much time as one hour. Subsequently, the frothy layer is removed from the top and discarded. The remaining desirable mixture is then decanted from the settled glass balls.

Figure 2:
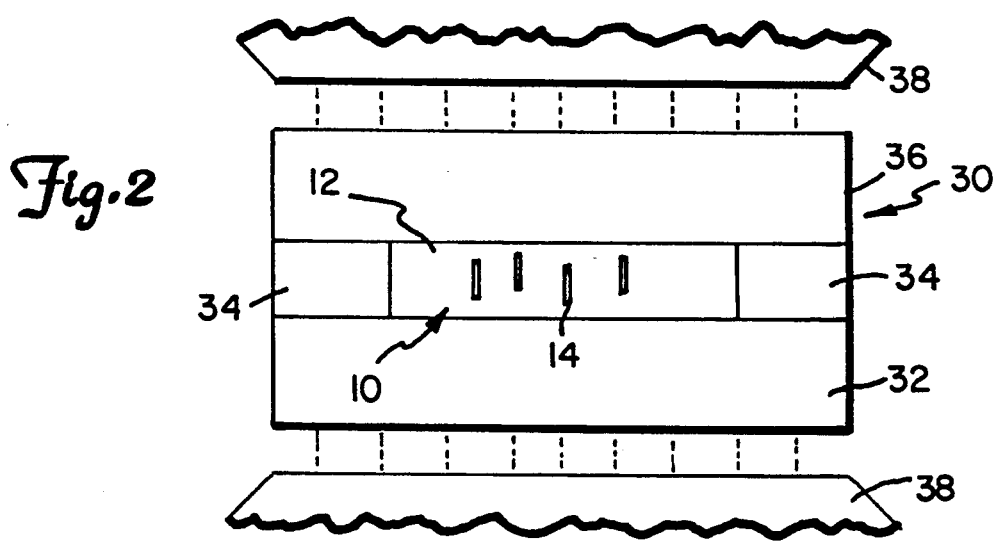
FIG. 2 is an enlarged cross-sectional representation of an apparatus which may be employed in the process used to make the preferred invention.

After the aciculae have been uniformly mixed into the resin, a polymerizing agent can be added and also uniformly mixed into the resin-aciculae suspension. After adding the polymerizing agent, the mixture is poured on a mold surface. A simple mold, as represented in FIG. 2 at 30, may be formed using a glass plate 32 pretreated with a mold release agent. After a short period of time, any air entrained within the mixture rises as air bubbles. The bubbles burst at the surface of the resin mixture, leaving a mixture of aciculae, resin and polymerization agent. The mold is then completed by adding spacers or shims, 34, such as for example, approximately 0.050 inch (1.25 mm.) thick material, and covering with a second glass plate 36. The spacers 34 control the separation of the first and second glass plates 32 and 36, thereby determining the thickness of the solidified light control film 10 which will be formed.

Subsequently, a magnetic field is applied to the mixture in the mold, such that the flux lines are generally perpendicular to the glass plates. The magnetic field strength must be sufficiently strong to cause an alignment of the aciculae. Preferably, an electromagnet 38 is used to provide the magnetic field which aligns the aciculae within the as yet uncured resin. The aciculae 14 tend to align such that the longitudinal axes of the aciculae are essentially parallel to the flux lines of the magnetic field. After the aciculae are aligned, the magnetic field is maintained until the viscosity of the resin increases (as a result of polymerization) to a viscosity sufficient to lock or hold the aciculae 14 in aligned positions perpendicular to the surface 18. Typically, curing occurs over several hours, although alternative resin materials and solidifying methods may be employed to greatly reduce the time required to lock the aciculae 14 in position.

However, the viscosity of the liquid resins must be sufficiently low to allow mixing and aligning of the aciculae. When solidified, the matrix material must be generally light transmissive and preferably flexible.

Examples of suitable ethylenically unsaturated resins include the widely used, commercially available polyester molding/casting resin systems (such as Chemco Clear Casting Resin and Chemco Liquid Hardener: Chemco Resin Crafts, Dublin, Calif. 94568.) Suitable methods for initiating the polymerization reactions that convert these liquid, ethylenically unsaturated resin solutions into thermoset solid or cross-linked visco-elastic matrices of the present invention include the thermally activated free radical polymerization initiators such as: asobisisobutyronitrile (AIBN), lauryl peroxide, tertiary butyl hydroperoxide, methyl ethyl ketone (MEK) peroxide, and benzoyl peroxide as are well known in the art. Furthermore, these ethylenically unsaturated resins can be radiation cross-linked using various sources of actinic radiation such as: ultraviolet light, X-rays, gamma rays, and high energy electron beams.

Other suitable resin systems include epoxy resins (such as Buehler Epo-Mix, No. 20-8133-001, Buehler Ltd., 41 Waukegan Road, Lake Bluff, Ill. 60044), and Bismaleimide resins (such as Ciba-Geigy Matridmid 5292, Ciba-Geigy, Plastics and Additives Division, 3 Skyline Drive, Hawthorne, N.Y. 10532).

Thermoplastic resins are also potential matrix materials. With thermoplastic resins, the thermoplastic first is melted. Next, the aciculae are suspended in the melt and the melt subjected to an aciculae aligning force, such as a magnetic field. Finally, the thermoplastic resin is cooled to a solid, thereby locking the aciculae in the aligned position in a solid matrix. An example of a potentially suitable thermoplastic is polyethylene (such as Epolene N-15, Eastman Chemical Products, Kingsport, Tenn. 37662).

Various materials may be suitable for aciculae. Aciculae should have a minor diameter of about 2 microns or less, preferably less than 1 micron and most preferably less than 0.2 microns. Additionally, the aspect ratio, i.e. the ratio of the length of the longitudinal axis to minor diameter, should be at least 5 or more, preferably greater than 10, and most preferably greater than 50 or more. Generally, sharper transitions (between angles generally transmissive to impinging light and angles generally opaque to impinging light) are consistent with higher aspect ratios of the aligned aciculae.

Additionally, the composition and viscosity of the suspension should be such that the aciculae can be aligned in the liquid mixture by external electric or magnetic fields or flow fields during the formation of the solid or visco-elastic matrix. Suitable aciculae materials are often described as, but are not limited to, ferroelectric; ferromagnetic, such as iron, cobalt, and chromium (IV) dioxide; ferrimagnetic, such as gamma iron oxide, magnetite, and barium ferrite; paramagnetic; ferrofluidic; and the like.

The preferred aciculae have high aspect ratios and are conveniently formed in a process in which small quantities of a carbonyl of a ferromagnetic metal are fed into an oxygen-free chamber. The carbonyl particles decompose when subjected to a rising temperature gradient. The released metal atoms from the decomposed particles are agglomerated along the flux lines of a homogenous magnetic field to form filaments or aciculae with an aspect ratio as high as 100,000:1. The process is disclosed in U.S. Pat. Nos. 3,441,408; 3,510,829; 3,955,962; and 4,273,807.

The dispersion of the aciculae within the mixture is possible by means other than by using a ball mill. For example, high shear mechanical mixers such as Waring Blenders (Waring Products Division, Dynamics Corp. of America, New Hartford, CT 06057) can be employed. Alternatively, high power ultrasonic dispersion equipment, such as a Branson Sonifier (Branson Sonic Power Co., Danbury, CT 06810) can be employed.

The thickness of the film is variable within a wide range. However, films thinner than 1 mil (25 microns) may be very susceptible to damage in handling. Additionally, the length of the aciculae also provides a lower limit to the film thickness of about 0.1 mil (2 microns). The maximum thickness of the film is limited primarily by the ability to generate uniform magnetic alignments across large gaps. Generally, for control of glare on luminous screens, a practical limitation on the maximum thickness of the film is on the order of millimeters because the cutoff angle becomes increasingly small as the thickness of the film increases. Additionally, thicker films tend to transmit less of the incident light. However, thicker films with very small cutoff angles may be useful in other applications. By "cutoff angle" is meant the angle between a line parallel to the longitudinal axes of the aciculae and a line of view at which the film appears generally opaque.

Thicker or thinner films and the dimensions of the aciculae employed determine the concentration of aciculae necessary to provide substantial light transmission perpendicular to the surface and substantial opacity at other angles. Generally, thin films, i.e. about 0.050 inches (1.25 mm.) thick, of polyester including a high loading of iron aciculae (i.e. from about 0.3 to 0.7 weight percent of about 0.2 micron diameter by about 500 micron long aciculae) are preferred because of savings in materials, flexibility, good light transmission and cutoff angles of about 45° when the aciculae are aligned generally perpendicular to the film surface.

When employed as a glare control film on luminous screens, it may be helpful to provide a mat finish on the surface closest to the viewer to further eliminate reflected glare from that surface.

In an alternative embodiment, the magnetic field, employed to align the aciculae during solidification of the sheet material, is arranged at an angle, which is not perpendicular to the sheet. After solidification and removal, the resulting light control film is transmissive to light impinging on the surface at the angle (or within the cutoff angle from the angle) and is opaque to light impinging at angles exceeding the cutoff angle.

Figure 3:
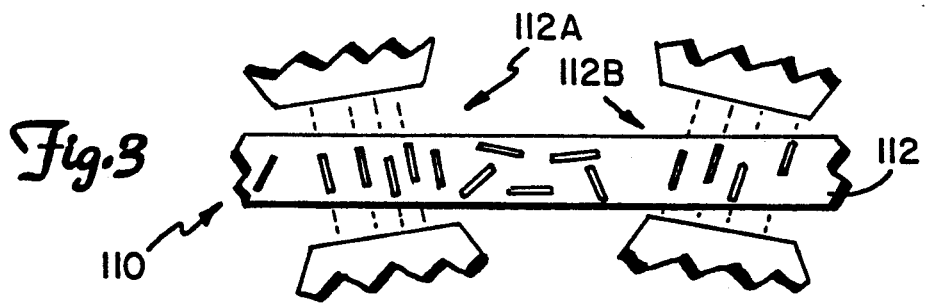
FIG. 3 is an enlarged cross-sectional representation of an alternative apparatus which may be employed in the process of making an alternative embodiment of the present invention.

In a further embodiment, as depicted in FIG. 3 at 110, during solidification of the sheet material 112, a first portion or region 112A of the sheet being molded is subjected to a first magnetic field 138A having a first orientation direction or angle and a second portion or region 112B of the sheet being molded is subjected to a second magnetic field 138B having a second orientation direction or angle different from the first angle. The resulting light control film 110 includes two different regions: a first region 112A which is transmissive only to light impinging within the cutoff angle from the first direction, and a second region 112B which is transmissive only to light impinging within the cutoff angle from the second direction. Such a sheet or film 110 is useful for controlling the direction from which information of a luminous screen display can be observed. This further embodiment is particularly useful for allowing two observers, seated alongside one another, to each view certain portions of information on a luminous display screen while not being able to view information visible to the other person. Such an arrangement is particularly useful in an instructional or testing situation where an instructor or examiner privately views information about a student sharing the same screen. Additionally, two students could share the same screen without being distracted by the other student's portion of the screen. The film can also be prepared with only a single aligned region or a plurality of aligned regions. Unaligned regions of such films are generally opaque to light impinging from any direction.

Figure 4:
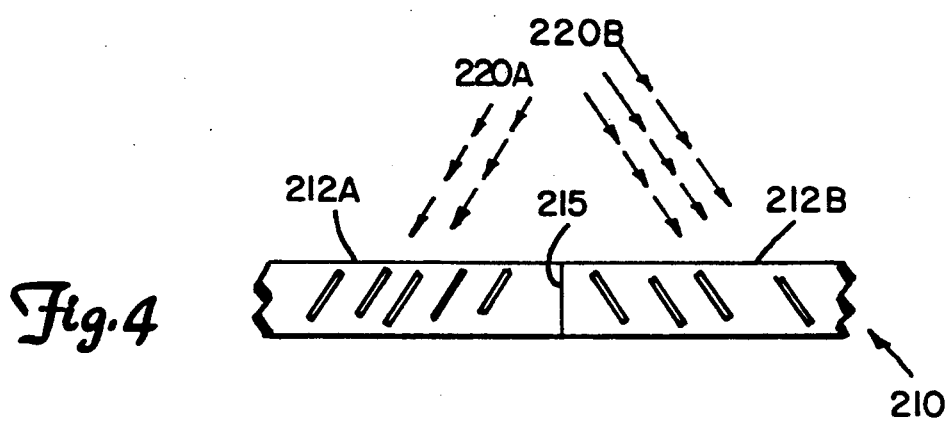
FIG. 4 is an enlarged cross-sectional representation of a further embodiment of the present invention.

Alternatively, a light control film having two different regions each of which is transmissive to light impinging upon the surface from a direction different from the other region, may also be formed by cutting portions from a sheet transmissive to light at an angle, rotating one of the portions and subsequently bonding the two portions, as represented in FIG. 4 at 210. The portions 212A and 212B are bonded at 215. Portion 212A is transmissive to light 220A impinging from angle A but not transmissive to other light such as 220B which impinges at an angle outside the cut-off angle for portion 212A. Similarly, portion 212B is transmissive to light 220B but not to light 220A.

In summary, the present invention includes a sheet of light control film comprising a matrix which is light transmissive and a region of aciculae which are aligned in parallel and fixed within the matrix of the region. The region may cover a large area of the sheet or may be one of several smaller regions of the same sheet. The region has the useful property of allowing light impinging parallel to the aligned aciculae to be transmitted through the sheet, while remaining opaque to light impinging from other angles. In turn, this property is effective to reduce glare. This property is also effective to limit viewing angles from which a luminous display may be observed. The angle of alignment of the aciculae of the region can be determined by the orientation of an aligning magnet prior to solidification or polymerization of the matrix. Multiple aligning magnets with different orientations can be employed to generate distinct regions with different aciculae orientations. A sheet of film with distinct regions of differently aligned aciculae may be used to enable multiple observers to receive visual information from selected regions of a luminous screen while blocked from other regions. Such a multi-region screen also reduces glare.

EXAMPLE 1

In a flint glass, wide-mouth, half-pint container, 0.194 grams of aciculae (iron particles, about 0.2 microns in diameter and about 500 microns in length, produced by the process described in U.S. Pat. No. 3,441,408) were mixed with 47.52 grams of polyester resin (Chemco Clear Casting Resin). Several flint glass balls, approximately 15 mm in diameter, were added and the mixture was milled on a roller type jar mill for 24 hours. The resulting frothy mixture was allowed to stand in a quiescent state. Subsequently, a very frothy layer was decanted from the mixture. The remaining nonfrothy mixture was milled for an additional few hours. Fifteen milliliters of the resulting mixture was retrieved from the flint glass balls and 7 drops of polyester resin polymerizing agent (Chemco Liquid Hardener) were added to the retrieved mixture while stirring. This mixture was then poured onto a glass plate treated with a resinous mold release agent (Mold Release 225, Ram Chemicals, Gardena, Calif.). The mixture was allowed to stand long enough for most of the entrained air bubbles to rise to the surface and burst. The resulting mixture was free from bubbles.

Next, a 0.050 inch (1.25 mm.) edge shim was used to outline the mixture and a second glass plate treated with a mold release agent was placed over the mixture to effectively mold the mixture into a sheet.

The mold containing the mixture of aciculae, resin and hardener was placed in the gap of an electromagnet such that the flux lines were generally perpendicular to the surfaces of the mold. The electromagnet had 300 turns on a semi-circular laminated iron core. Electrical power of 16.8 volts at 26.5 amps was applied to the electromagnet. The electromagnet included a 2 inch gap. The mold containing the resin and aciculae were left in the magnetic field while the resin cured.

Subsequently, the electromagnet was turned off. The mold containing the cured resin was removed from the gap of the magnet. When the mold was opened, the resulting flexible sheet was removed and observed for its light transmission properties. A red LED calculator display could easily be read through the sheet when the sheet was perpendicular to a line between the LED display and the viewer's eye. However, the same sheet was opaque at an angle somewhat less than 45° off axis.

EXAMPLE 2

The following example was made to show the difference resulting from the use of ferromagnetic particles which are not of an acicular shape. 1.2458 grams carbonyl iron powder, generally spherical particles of iron, (GAF Iron Powder SF, Mix No. 712, Code No. 11-63768, GAF Corporation(, was mixed with 34.23 grams of polyester resin (Chemco Clear Casting Resin) and ball milled for three hours. 15 milliliters of the mixture were decanted into a beaker and allowed to deaerate for 15 minutes. Eight drops of polyester resin polymerizing agent (Chemico Liquid Hardener) were added and the mixture cast between two glass plates which were pretreated with mold release and shimmed to 0.050 inches (1.25 mm.). This sample contained 3.5 percent iron by weight.

The mold and mixture including the iron powder, resin and hardener were placed in magnetic field in similar fashion to that of the first example. After the resin had cured, the mold was removed from the magnetic field and the resulting sheet observed for light control properties. The resulting sample was grainy in appearance, and showed a very weak or gradual cut-off of off-axis light transmission. In other words, unlike the sharp transition from transparent to opaque observed in the film of Example 1, the comparative film of Example 2 had a gradual transition from transparent to opaque as the observation angle progressed from perpendicular toward parallel to the surface of the film.

EXAMPLE 3

A suspension was prepared of 0.5482 grams of aciculae (iron particles prepared by the method referenced in Example 1) and 68.65 grams of polyester resin (Chemco Clear Casting Resin) by ball milling for 20 hours. Fifteen milliliters of the suspension were decanted into a beaker and allowed to deaerate for 15 minutes. An additional five milliliters of the polyester resin was added and mixed to bring the volume to 20 milliliters. Ten drops of polyester resin polymerizing agent (Chemico Liquid Hardener) were mixed in and the mixture cast between two glass plates previously treated wit mold release and shimmed to 0.050 inches (1.25 mm.). The sample contained 0.6 percent iron by weight.

After being allowed to cure or solidify in a magnetic field as in Example 1, the mold was removed from the magnetic field and opened. The resulting flexible light control sheet had an optical density of 1.03 when measured perpendicular to the surface (i.e., along the axes of the aligned aciculae). The sample was not grainy in appearance and showed a strong opacity to light entering the film at angles other than substantially perpendicular to the surface.

Although the present invention has been described with reference to preferred embodiments, workers skilled in the art will recognize that changes may be made in form and detail without departing from the spirit and scope of the invention.

What is claimed is:

1. A light control film having a sharp cutoff angle comprising a plurality of magnetically alignable aciculae having aspect ratios in the range of 2,500 to 100,000:1 fixedly disposed within a solidified resin matrix, said resin matrix being light transmissive material and thermoplastic or thermoset, said aciculae having their major axes generally aligned in parallel within said matrix.

2. The light control film of claim 1 wherein said article is a sheet having a pair of planar major surfaces and said aciculae are aligned with their major axes generally normal to the surfaces.

3. The light control film of claim 2 wherein the article is a sheet with a thickness of about 1.25 mm. and the aciculae are about 0.2 micron in diameter and about 500 micron in length.

4. The light control film of claim 1 wherein the matrix comprises ethylenically unsaturated resin.

5. The light control film of claim 1 wherein the matrix comprises polyethylene.

6. The light control film of claim 1 wherein the matrix comprises an epoxy resin.

7. The light control film of claim 1 wherein the matrix comprises a polyester polymer.

8. The light control film of claim 1 wherein the aciculae are selected form the group consisting of iron, cobalt, gamma iron oxide, magnetite, barium ferrite and chromium (IV) dioxide.

9. The light control film of claim 1 wherein the aciculae have a minor diameter of less than about 2 microns and a major axis of greater than about 10 microns.

10. The light control film of claim 1 wherein the article is a sheet with a thickness of from about 2 microns to about 3 millimeters.

11. A multi-directional light control film having a sharp cutoff angle comprising:
 a matrix of generally light transmissive material;
 a plurality of magnetically alignable aciculae having aspect ratios in the range of 2,500 to 100,000:1 fixedly disposed within said matrix; and
 wherein the film comprises a first region, having aciculae oriented in a generally parallel arrangement with each other and at a first angle to a plane of the film; and a second region having aciculae oriented in a generally parallel arrangement with each other and at a second angle to the plane of the film, said second angle being different from said first angle.

12. The film of claim 11 wherein the aciculae are selected from the group consisting of iron, cobalt, gamma iron oxide, magnetite, barium ferrite, and chromium (IV) dioxide.

* * * * *

UNITED STATES PATENT AND TRADEMARK OFFICE
CERTIFICATE OF CORRECTION

PATENT NO. : 5,147,716
DATED : September 15, 1992
INVENTOR(S) : PETER A. BELLUS

It is certified that error appears in the above-identified patent and that said Letters Patent is hereby corrected as shown below:

Col. 9, line 27, delete "form", insert "from"

Signed and Sealed this

Seventh Day of September, 1993

Attest:

BRUCE LEHMAN

Attesting Officer

Commissioner of Patents and Trademarks